United States Patent Office 3,576,645
Patented Apr. 27, 1971

3,576,645
BREWING ADJUNCT AND BREWING PROCESS
Tibor A. Rozsa, Winona, Minn., assignor to Bay State
Milling Company, Winona, Minn.
No Drawing. Continuation of application Ser. No.
504,152, Oct. 23, 1965. This application Mar. 21,
1969, Ser. No. 810,915
Int. Cl. C12c 7/00, 11/00
U.S. Cl. 99—31                                              12 Claims

ABSTRACT OF THE DISCLOSURE

Cereal grains such as rye, barley, wheat, corn, milo, sorghum or any combination thereof are steeped in water at a temperature sufficient to pass the grain through the optimum conditions in which the natural enzymes therein can operate to change insoluble protein and pentosans to soluble protein and pentosans, the cereal grains are then cooked or pregelatinized at a temperature in the range of 200° F. to 220° F. for five to thirty minutes, after which the grain is dried at a temperature in the range of 110° F. to 220° F. until the moisture content is in the range of 7% to 11% to inactivate the enzymes so that the pregelatinized grain can be stored, and the grain is then granulated.

---

This application is a continuation of application Ser. No. 504,152, filed Oct. 23, 1965, now abandoned.

This invention pertains to an improved and new beer brewing process and a new adjunct and more specifically to a new adjunct which can be utilized in an improved and new beer brewing process that produces a beer having greatly enhanced characteristics.

Originally in the brewing art 100% barley malt was used to make a mash and wort extraction which after fermentation provides the body of the beer. Gradually other cereals were introduced into the mash, for example, rice breakage, wheat, milo, and corn grits. These cereals added to the mash are called adjuncts. Corn grits is the most predominant adjunct used presently in the United States of America and it constitutes 30% to 45% of the "grain bill," or total solids, going to the mash. These adjuncts lower the protein content of the wort and beer and change it from a viscous, heavy-bodied darker beer to a light, amber colored, rather dry beer. In addition to changing the character and image of the beer, to please a much greater number of consumers, the adjuncts are much more reasonably priced than malted barley and, therefore, considerably reduce the cost of beer. The major constituents of any brewing adjunct are starch, protein and fats, plus traces of enzymes. While the starches are very useful in the brewing process, the protein and fats frequently result in quality problems. For example, corn protein is mostly insoluble in water and not dispersible. It is not composed of the same type of protein molecules as the albumins of the barley malt. Corn protein with the hydrocolloids does not make good beer foam with fine grain bubbles and it collapses quickly. Vegetable fats like corn oils are high in unsaturated free fatty acids. These fatty acids behave like surfactants and are foam depressant. Furthermore, the gradual oxidation of the unsaturated fats is difficult to prevent. These oxidation products can react with the proteins and may produce putrefaction products which impart an unpleasant bitter taste to the beer. The oxidation of the unsaturated fats and the proteins greatly limits the useful storage life of the beer.

In the present invention pregelatinized grain is produced from cereal grains such as rye, barley, wheat, corn, milo or sorghum, as well as any cereal grains or mixtures which might be similar to these. The cereal grain is steeped to raise the water content therein to a level sufficient to subsequently permit complete gelatinization. The required water level is, in general, greater than 30%. During steeping the grain passes through the optimum conditions in which the natural enzymes therein can operate to change insoluble protein to soluble protein and insoluble petosans to soluble pentosans. The cereal grain is then treated to inactivate the enzymes so that the pregelatinized grain can be stored indefinitely and so that no deleterious enzymes enter into the mash.

During the initial testing of the pregelatinized grain as an adjunct for beer, it was found that beer produced from this adjunct had foam characteristics which were far superior to any beer presently produced and, in fact, far superior to anything anticipated. The foam had very fine grain, it lasted a long time in a drinking glass and left an excellent lace pattern on the side of the glass. Also, the beer itself had excellent flavor and flavor stability (the flavor actually improved with age) and no haze or settling was prevalent after relatively long periods of storage. These advantages were initially unexpected and most of the initial testing was directed toward the advantages of having a cheaper adjunct which simplifies the brewing process. However, once the unexpected advantages were discovered more testing was accomplished and it was found that the present invention will, in most cases, completely eliminate chemical additives for foam stabilization, thereby greatly improving the flavor of the beer while greatly reducing the cost of production.

Although it can be shown that grains, such as corn, having a relatively large amount of fats therein can be improved in the present process to make a better beer, than without pregelatinizing, the exact reason for this is not known at the present time. It is believed that during the process some fractions of the extractible fats are removed by volatile evaporation. Also, some of the unsaturated fats or lipids are believed to react as a result of high temperature, or are catalyzed to react with oxygen to produce more saturated hydrogenated fats which, thus are not available for further oxidation in the beer. Because the lipids are more saturated they are less susceptible to oxidation and, thus, the beer produced from this adjunct has a much longer shelf life or storage time. There is much support for this theory in the fact that air separated rye flour which is high in protein, when used as an adjunct in the cooker or in mash at approximately 45° C., makes a good beer with good foam. However, the foam is substantially no more stable than that from corn grits because the rye flour is relatively high in fatty acids.

Many of the proteins in the pregelatinized grain are complexed with carbohydrates known as pentosans and hexosans. When the proteins are enzymatically treated during pregelatinization to make soluble proteins, the pentosans are concurrently made soluble. While soluble proteins contribute to the body of the beer and produce a good foam, this foam becomes stabilized by pentosans so that it is long-lasting and provides a good adhering lace pattern on the drinking glass. Thus, the present invention not only provides a beer with a good foam that is fine grained and long-lasting, but also provides a foam that adheres to the wall of the drinking glass.

Many American beers seek to achieve foam quality with the use of Gum Arabic or with the Algin derivatives yielded by sea weed or recently by cobalt compounds. These foam aids, when solubilized, are viscious solutions and brewery workers refer to them as sticky. No extract is produced by these substances and their value is purely aesthetic.

Many careful pilot brewing and analytical tests utilizing various pregelatinized grains have been completed in connection with this invention. Rye and barley have been found to be especially adapted to this process and have a great many advantages such as, for example, a lower cost. Moreover, they can easily to debranned and are otherwise generally easy to work with. Pregelatinized rye is especially adapted to this invention because rye grain is currently cheaper than any other grain and is very easy to work with in the processes to be set forth. More than half of the proteins of rye, for instance, are naturally water soluble and belong to the albumin type that helps to build a fine grain foam. The soluble rye protein resists chilling without producing a haze and the pregelatinized rye has negligible lipid content compared to adjuncts such as corn grits. Also, the remaining lipids in the pregelatinized rye are more saturated and less prone to oxidize. As previously stated, the proposed process provides a large amount of soluble proteins and pentosans in addition to that appearing naturally in the grain and, it is believed, saturates the lipids to provide an adjunct which produces a greatly improved foam stability and flavor stability in the beer while optionally adding flavors, such as rye, in controllable amounts.

After the grain is treated enzymatically and hydrothermally to increase the soluble proteins and pentosans, it is treated to deactivate the enzymes and pregelatinize the starch so that it is ready for the mashing step where it is converted to glucose, maltose, maltotriose, etc. Thus, the conversion step and the mashing step, is simplified. This treatment takes place under conditions such that the protein is not denatured and superfluous enzymes as well as undesirable flavor, such as excessive rye flavor, are eliminated and desirable flavors, such as caramel, are created. Thus, the final pregelatinized grain is ready to be introduced directly into the mash tub or has the advantage of a practically indefinite storage life.

It is an object of the present invention to provide a new and improved brewing process.

It is a further object of the present invention to provide a new and improved process for producing a brewing adjunct.

It is a further object of the present invention to provide a new and improved adjunct for brewing.

It is a further object of the present invention to provide an adjunct for brewing which is inexpensive and still produces a greatly improved beer.

It is a further object of the present invention to produce an adjunct for brewing which maintains the yield and decreases the time required in brewing.

It is a further object of the present invention to provide an adjunct for brewing consisting of natural substances which produce a beer with better flavor and foam stability and better foam characteristics, including cling, and eliminates the necessity of chemical additives for this purpose.

It is a further object of the present invention to provide an adjunct for brewing which greatly improves the clarity and storage stability of the beer produced.

It is a further object of the present invention to provide an adjunct for brewing which greatly improves the flavor of the beer produced.

It is a further object of the present invention to provide an adjunct with a substantially indefinite storage life.

These and other objects of the present invention will become apparent to those skilled in the art upon consideration of the accompanying specification and claims.

The brewing process begins essentially with the production of barley malt, which is the main constituent of all beers. Barley malt is generally expensive and requires a great amount of time and skill in the production thereof. First the barley is steeped in water at temperatures of approximately 55°–65° F. for 24 to 72 hours. Steeping speeds up the metabolism of the grain and starts germination therein. Once the required steeping is completed and the barley reaches the elevated moisture level of 40–44%, the grain is spread on a clean surface such as a large floor or the like and germination is allowed to continue at a controlled temperature of approximately 58° F.–65° F. for 4 to 9 days. Near the end of the germination period, when the acrospire has reached two-thirds to three-fourths of the length of the barley kernel the metabolism is slowed by placing on a kiln and drying under temperatures favorable to enzyme retention. Because the various temperatures and time period combinations are very critical, basic characteristics of the malt can be changed, sometimes with very adverse effects.

The most common adjunct used at the present time is corn grits which is generally added in a maximum composition of 45% of the grain bill. Prior to use in the mash tub, the raw corn must be cooked to gelatinize the starches so that they are ready for the enzyme conversion. The cooking of the grits normally deactivates all enzymes therein and removes some of the components which would add undesirable flavors. After cooking, the adjunct is ready to be added directly to the crushed malt in the mashing stage. By using the new adjunct provided by this invention, the cooking stage in the breweries can be partially or completely eliminated and it is anticipated that a substantially new brewing process may be utilized in brewery plant production.

The new adjunct is produced in the following manner. A cereal grain such as rye, barley, wheat, corn, milo or sorghum is chosen as the basic material for the new adjunct. In this explanation, rye will be utilized because it has advantages over any of the other cereal grains, as previously explained. The rye grain is steeped in water to increase its moisture content for later complete gelatinization. The temperature of the steeping water should be in the range of approximately 50° F. to 190° F. and preferably 105° F. to 180° F., and steeping times will be in the range of 24–1 hours respectively. During the steeping of the rye grains, while the grain absorbs water, proteolitic enzymes operate on the insoluble proteins and hydrolize them, or make them water soluble, and the pentosanases hydrolize the insoluble pentosans. The optimum temperature for activity of the proteolitic enzymes and pentosanases is in the range of approximately 100° F. to 120° F. Therefore, by steeping the rye grain in water for a suitable period at a temperature which is close to optimum for proteolitic and pentosanase enzyme activity, a considerable quantity of insoluble proteins and pentosans can be made soluble in the desired proportion to suit the individual brewer. The rye grain is steeped in the warm water until its moisture content is increased to more than 22% and preferably approximately 42%. The steep water may contain a small percentage, less than approximately 2% and preferably approximately ½%, of sodium bisulfite. However, it should be understood that the sodium bisulfite is not essential to this invention. The small proportion of sodium bisulfite added to the steep water increases the final yield of soluble protein since the sulfite ion helps to change the glutenins, which are insoluble proteins, to soluble proteins and it stimulates the proteolytic enzymes. Also, sodium bisulfite has a bleaching effect on the pregelatinized grain and controls the microflora. All these benefits must be paid for by a significant increase of process costs. In the event that barley is utilized in the present invention, it is suggested that it be scarified or dehusked to the degree of 4–5% before steeping to make the grain more available to the water and shorten the steeping time. Thus, during steeping insoluble proteins and pentosans in the cereal grains are changed to soluble proteins and pentosans by chemical and natural enzymatical processes.

After the rye grain is steeped it is treated in a cooker operating at a temperature in the range of approximately 200° F. to 220° F. The steeping water may be moved from the grain previously and steam at atmospheric pressure may be used in the cooking step or the steeping water may be heated directly at higher cost. The cooking step has a three-fold purpose in that it gelatinizes the starch therein while inactivating or destroying the enzymes and evaporating volatile rye flavors. Care should be used to insure that the cooking period is proper so that the protein is not greatly denatured. The cooking period should be in the range of approximately 5 to 30 minutes and 15-20 minutes has been found to be a somewhat preferable period. It has been found also that some time during the steeping, cooking and subsequent drying (to be explained presently) periods lipids are removed or reacted to produce fats which do not harm the foam of the beer or its storage stability. It is believed that some fractions of the extractible fats are removed by volatile evaporation and that some of the unsaturated fats or fatty acids are changed to more saturated fats.

After the grain is cooked a sufficient time to gelatinize the starch, deactivate the enzymes and reduce rye flavors, it must be dried and optionally cured. The drying and curing of the grain prepares it for storage and, once dried and cured this new adjunct may be stored almost indefinitely. In general, the drying and curing process may be two steps or it may be a single step, or the curing may be omited if the steeping is carried on at high temperature, for example, 170-190° F. The drying takes place at an air temperature in the range of approximately 110° F. to 220° F. and continues until the moisture content of the grain is in the range of approximately 7% to 11%. It may take 24-2 hours in one or two stages at different temperatures. The curing of the grain takes place at a temperature in the range of approximately 170° F. to 210° F. and continues for a period in the range of approximately 180 to 20 minutes. Preferably the curing is at a temperature of 185° F. and continues for approximately 120 minutes. The drying of the grain takes place at a temperature which is sufficiently low to insure that the protein will not be greatly denatured and some care must be utilized to insure that the drying period does not extend beyond the required time. The curing step is optional and not essential to the process for producing the new adjunct, and is partly utilized to further volatize foreign and undesirable flavors in certain of the grains while adding desirable flavors. Rye grain especially is noted for a somewhat strong peculiar flavor part of which carries over into the final beer product if the curing stage is omitted. This organic bitter component is highly desirable on some regional beer markets. The curing stage can be controlled to volatize a sufficient amount of the foreign flavors without denaturing too much of the protein and to generate through the Maillard reaction melanoids to impart some of the typical cereal caramel flavor.

At some convenient time in the process the rye grain is debranned. The debranning can be accomplished by some well known machinery such as barley dehusking, pearling machinery or rice shelling, hulling and polishing machines. The debranning should remove more than approximately 10% of the total weight of the grain. Debranning enhances the effect of the enzyme and/or sodium bisulfite modifications in the steep. That is, insoluble proteins and pentosans as well as lipids are mechanically removed. Much of the rye flavor is removed in the debranning process because the major centers of the flavor are carried by the aleurone in the lipids. Also at some convenient time in the process the debranned grain should be granulated. Since the wort extracted from the mash tub is filtered through the solids during the lauter tub treatment it has been found that a coarser granulation, in general something like 70% coarser than 20 mesh wire, provides a faster run off of the wort and, therefore, shorter production time.

When pregelatinized grain is used in the present brewing process, the proportions of barley malt and adjuncts remains the same to maintain the image for the consumers, but the pregelatinized grain takes the place of some of the other adjuncts, such as corn grits or the like. It has been found through experimentation that in general the new adjunct should not be used to replace the old adjunct entirely in present brewing process, but should be substituted for a portion thereof. Specifically, in a beer made from 70% barley malt and 30% corn grits, when a 12° Balling wort is desired approximately 5% of the grain bill should be the new adjunct of pregelatinized grain. Similarly if an 11° Balling wort is desired approximately 7½% of the grain bill should be pregelatinized grain and if a 10° Balling wort is desired approximately 10% of the grain bill should be pregelatinized grain. These values are approximations and slight variation therefrom may be made. Also, it should be understood that these vaules were arrived at by producing beers, having the most desirable foam characteristics and taste characteristics with present brewing equipment. For certain cases, especially if changes are made to the brewing equipment, it might be desirable to vary from these values considerably while still actually remaining within the scope of the present invention.

Although only a part of the adjuncts added to the brew in the foregoing examples are pregelatinized grain, there are still a great many advantages therein. Since the pregelatinized grain has a large quantity of soluble proteins and pentosans therein, a relatively small amount of the new adjunct is enough to improve foam and stability. Thus, while the unit cost of the "grain bill" remains substantially the same, the special foam stabilizing additive compounds may be omitted and, therefore, the cost of the finished beer is reduced. The addition of the pregelatinized grain to the brewing process increases the shelf life of the beer since the free fatty acids are substantially removed and the pregelatinized grain replaces a portion of the corn grits which have a large amount of free fatty acids. Thus, it can be seen that the addition of even a small amount of pregelatinized grain as an adjunct in the brewing process has a great many advantages.

As previously mentioned, substantially new brewing process utilizing the new adjunct, pregelatinized grain, is possible by replacing part of the malt as well as part of the adjuncts. The new brewing process is a substantially continuous process in which high a-amylase malt rather than brewer's type malt is utilized. High a-amylase malt is a barley malt which is fully germinated but not cured. Present distiller's malt (high a-amalyse malt) has advantages over the brewer's malt in that it is somewhat cheaper and enzymatically stronger. The drying and curing of the brewer's malt inactivates a large quantity of the diastatic enzymes which convert the starches to fermentable sugars during the mashing stage of brewing. Since high a-amylase malt is not cured the diastatic enzymes therein stay more intact and can operate on the starches of the malts and on increased proportion of adjuncts more quickly and more thoroughly to produce a greater amount of wort.

Because the high a-amylase malt has more active enzymes a smaller quantity may be utilized, approximately half of the currently used brewer's malt. The eliminated brewer's malt is replaced by the proposed adjunct, pregelatinized grain. It should be noted that this blending does not have to be performed at the brewery but could actually be accomplished at the malting house. The malting house can manufacture the pregelatinized grain and blend it with high a-amylase malt to the brewer's specifications to obtain optimum extracts necessary, as well as the desired foam and flavor. It is anticipated in the new brewing process that the malt and corn and rice adjuncts could be replaced with pregelatinized barley and pregelatinized rye. Thus, in the new brewing process 30% to 70% high a-amylase malt (similar to distiller's malt) will be blended with 55% to 10% pregelatinized barley and rye grain besides reduced amount of conventional adjuncts. For example, wort produced from 56% high a-amylase malt and 35% pregelatinized barley grain could replace wort formerly produced from 100% brewer's malt and wort produced from 40% high a-amylase malt, 20% pregelatinized barley grain, 10% pregelatinized rye grain and 30% corn syrup will replace wort formerly produced from 70% brewer's malt and 30% corn grits. The cooking step in the process thus would be eliminated. After the grain bill is blended the brew house continues in the usual manner. That is, the wort is drawn off the mash and lauter boiled with hop additives and the like after which the wort is cooled and allowed to ferment.

The new brewing process will result in considerable less cost since a smaller amount of high a-amylase malt will be utilized in place of the larger quantity of brewer's malt and since large quantities of low cost pregelatinized grain will be introduced. In addition to the great cost reduction per barrel of beer made in the brewery, production can be greatly increased in the melting house because the time required for the production of the malt and new adjuncts is greatly decreased while using the same equipment. Whereas the production of brewer's malt requires anywhere from 8 to 12 days, the production of the pregelatinized grain requires only 4 to 48 hours. The malting houses and the breweries will have greater flexibility and output through this new brewing process. Additional advantages which the new brewing process brings to the industry are that the pregelatinized grain will give the beer the same or improved extract, foam, stability and flavor while the high a-amylase malt will provide necessary cereal enzymes. Cookers could be completely eliminated in the breweries.

Following are examples of pregelatinized grain adjuncts produced by the new process set forth and a tabulation of some beers produced therefrom.

EXAMPLE 1

A pregelatinized rye grain adjunct was produced using the following steps:

Step A: Select a cereal grain which may be either rye, barley, wheat, corn, milo or sorghum. In this example rye grain was utilized.

Step B: The rye grain was steeped in water at a temperature of 60° F. until the moisture content was over 40%. This example is referred to as a low temperature steep.

Step C: The steeped rye grain was cooked at a temperature of 212° F. for 20 minutes.

Step D: The cooked rye grain was dried at a temperature of 120° F. until the moisture content was below 7½%.

Step E: The rye grain was then debranned and granulated in coarse and fine grinds. The coarse grind is defined as a grind in which approximately 70% remains on a U.S. Standard No. 20 sieve. The fine grind is defined as a grind in which approximately 70% remains on a U.S. Standard No. 20 sieve.

EXAMPLE 2

A pregelatinized rye grain adjunct was produced using the following steps:

Step A: Select a cereal grain which may be either rye, barley, wheat, corn, milo or sorghum. In this example rye grain was utilized.

Step B: The rye grain was steeped in water at a temperature of 110° F. until the moisture content was over 40%. This example is referred to as a medium temperature steep.

Step C: The steeped rye grain was cooked at a temperature of 212° F. for 30 minutes.

Step D: The cooked rye grain was dried at a temperature of 120° F. until the moisture content was below 7½%.

Step E: The dried rye grain was cured at a temperature of 190° F. for 2 hours. Some samples were produced without curing (see Tabulation Sheet).

Step F: The rye grain was then debranned and granulated in coarse and fine grinds. The debranning removed approximately 16% of the total weight of the grain in the coarse grinds and approximately 20% in the fine grinds.

EXAMPLE 3

A pregelatinized grain adjunct was produced using the following steps.

Step A: Select a cereal grain which may be either rye, barley, wheat, corn, milo or sorghum. In this example rye grain was utilized.

Step B: The rye grain was steeped in water at a temperature starting at 135° F. and increased to 180° F. over a period of one hour. This example is referred to as a high temperature steep.

Step C: The steeped rye grain was drained and allowed to rest at a temperature of 180° F. for 30 minutes.

Step D: The rye grain was cooked in atmospheric pressure at a temperature of 212° F. for 15 minutes.

Step E: The cooked rye grain was dried for 3½ hours at a temperature of 140° F. at which time the moisture content was 10½%.

Step F: The dried rye grain was then debranned and granulated in coarse and fine grinds. The debranning removed approximately 14.5% of the total weight of the grain.

EXAMPLES 4 AND 5

Pregelatinized grain adjuncts were produced using the steps set forth in Examples 1 and 2 but 2% sodium bisulfite was added to the steep water of Example 1 and ½% sodium bisulfite was added to the steep water of Example 2. Then sulfuric acid was added to the steep water to adjust the pH to 4.6.

| Examples of beers | Brewhouse data | | | | Cellar data | | | Beer quality | | | | Flavor rating | | | Clarity stability | | |
|---|---|---|---|---|---|---|---|---|---|---|---|---|---|---|---|---|---|
| | Total Extract, percent dry | Calculated malt extract, percent dry | Soluble protein | Runoff | Alcohol, percent wt. | Real degree fermentation, (percent) | Protein (g./100 ml.) | Color | | Foam index | Cling rating | Fresh beer | Incubated beer | Fresh beer | 1 week, 110° F. | 2 weeks, 110° F. | |
| Control 12° P. (malt, 70%; corn grits, 30%) | 77.3 | 72 | .535 | Normal | 3.95 | 64.2 | 0.378 | Normal | | ¹21.9 | (³) | 13.29 | 15.0 | ¹22 | ³50 | ⁴93 | |
| 11.2° P. (malt, 70%; Corn grits, 25%; pregelatinized rye, 5%) (ex. 2, fine grind) | 77.2 | 72 | .555 | Fair to normal | 3.57 | 62.8 | 0.441 | do | | ¹22.4 | (¹) | 12.85 | 13.55 | ¹24 | ²40 | ⁵64 | |
| 12° P. (malt, 70%; corn grits, 25%; pregelatinized rye, 5%) (ex. 4, fine grind) | 77.2 | 71.7 | .566 | Fair to slow | 3.81 | 64.0 | 0.42 | do | | ¹24.4 | (¹) | 13.15 | 13.56 | ¹22 | ⁶32 | ¹47 | |
| 11.2° P. (malt, 70%; corn grits, 25%; pregelatinized rye, 5%) (ex. 3, coarse grind) | 77.2 | 71.2 | .48 | Normal | 3.43 | 61.8 | 0.35 | Normal to darker | | ⁶19.3 | (¹) | 15.0 | 16.9 | ²26 | (⁷) | ²51 | |
| 10° P. (malt, 70%; corn grits, 20%; pregelatinized rye, 10%) (ex. 2, coarse grind) | 77.7 | 72.3 | .521 | Slow | 3.42 | 61.7 | 0.368 | Pale | | ²27.4 | (²) | 15.0 | 14.0 | ⁵30 | ²40 | ¹47 | |
| 10° P. (malt, 60%; corn grits, 30%; pregelatinized barley, 10%) (ex. 4, coarse grind) | 77.6 | 71.9 | .383 | Fast | 3.09 | 60.3 | 0.307 | do | | ¹24.5 | (¹) | 15.75 | (⁷) | ²25 | ²51 | ⁵70 | |
| 11.2° P. (malt, 70%; corn grits, 25%; pregelatinized wheat, 5%) (ex. 2, no curing; coarse grind) | 76.7 | 71.1 | .479 | do | 3.58 | 63.7 | 0.364 | Normal to darker | | ²30.1 | (²) | 12.71 | 14.33 | ¹23 | ¹37 | ⁵73 | |

¹ Very good. ² Good. ³ Fair. ⁴ Fair to poor. ⁵ Good to fair. ⁶ Excellent. ⁷ No test.

All tests tabulated in the above table were conducted in accordance with the published methods of the "American Society of Brewing Chemists." Also it should be noted that the higher flavor rating numbers indicate a better flavor.

In the above table the examples set forth refer to the previously listed examples and the pregelatinized grain adjunct was produced as specified therein. The control brew set forth therein was produced in the following manner and the remaining beers were produced using exactly the same steps except the described adjunct was added in the percentages listed.

Cereal cooker 1750 grams of "common corn grits" and 162 grams of malt are suspended in 10 liters of hardened distilled water at 45° C. The upward rise in temperature is immediately initiated, as indicated.

| Period rise, minutes: | Temperature ° C. |
|---|---|
| 15 | 63 |
| 7 | 74 |
| 17 | 77 |
| 12 | 101 |
| 30 (hold) | 101 |

It is to be noted that an approximate 15 minute period at 75° C. is permitted for liquefaction by the malt alpha-amylase.

Mash tub 4075 grams of ground malt are suspended in 10 liters of hardened water at 45° C. and held at this temperature for 30 minutes.

Coincident with the termination of this 30 minute period, the boiling cooker mash is slowly dropped (malt mash is stirred, to prevent areas of excessive heating) and a resultant temperature of 67–68° C. is achieved. The upward rise in temperature is immediately initiated, as indicated.

| Time, minutes: | Temperature ° C. |
|---|---|
| 5 | 70 |
| 5 | 72 |
| 10 | 78 |
| 3 | 78 |

After the three minute holding temperature at 78° C., the mash is transferred to a lauter tub (straining or wort separating device), held for 20 minutes, the "first" wort taken off and sparging conducted with 75° C. distilled water.

The kettle is filled to 38 liters and evaporative boiling conducted to achieve specified Balling wort. The appropriate hopping additions are performed.

The wort is cooled to 12° C., aerated, pitched with washed yeast, and fermented for 8 days at 13° C.

The "ruh" procedures as well as cellar practice are standard for the brewing of lager beer. All beer is chillproofed.

Beer is bottled to less than 0.7 ml. air/12 ounces and is pasteurized. Clear flint bottles are used.

Thus, a new adjunct has been described which, when added to the grain bill in the present brewing process, greatly improves the flavor and foam characteristics as well as the flavor stability. The new adjunct has a substantially indefinite storage life. In addition it has been shown that the new adjunct may be utilized to produce beers having lower density (normal beer is 12° P. but the trend is toward 10° P. and even 8° P.) but which still maintain all the characteristics of the higher density beers as well as new type beers having different characteristics, such as varying amounts of rye flavor. Also, a completely new brewing process has been described using the new adjunct.

While I have shown and described specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a process for providing an improved brewing adjunct the steps consisting essentially of:
   (a) selecting a suitable cereal grain from the group consisting of rye and barley;
   (b) steeping said grain in water at a temperature in the range of approximately 50° F. to 190° F. for a period approximately in the range of 1 to 24 hours until its moisture content is increased to more than approximately 22%;
   (c) cooking said steeped grain at a temperature in the range of approximately 200° F. to 220° F. for a period in the range of approximately 5 to 30 minutes for partially gelatinizing the starch, inactivating enzymes, and volatilizing flavor bearing lipids;
   (d) drying said cooked grain at an air temperature in the range of approximately 110° F. to 220° F. until the moisture content is in the range of approximately 7% to 11%; and
   (e) granulating said grain.

2. The process for providing an improved brewing adjunct as set forth in claim 1, including in addition to granulating the steps of debranning or dehusking the grain subsequent to drying.

3. The process for providing an improved brewing adjunct as set forth in claim 2, including in addition the step of curing the grain at an air temperature in the range of approximately 170° F. to 210° F. for a period in the range of approximately 20 to 180 minutes subsequent to the drying of the grain.

4. The process of producing a brewing adjunct as set forth in claim 2 having in addition the step of scarifying the grain prior to steeping.

5. The process of producing a brewing adjunct as set forth in claim 4 having in addition the step of curing the grain subsequent to drying the grain.

6. The process of producing a brewing adjunct as set forth in claim 2 wherein the water of step (b) contains sodium bisulfite.

7. The process of producing a brewing adjunct as set forth in claim 6 having in addition the step of scarifying the grain prior to steeping the grain.

8. The process of producing a brewing adjunct as set forth in claim 6 having in addition the step of curing the grain subsequent to drying the grain.

9. The process of producing a brewing adjunct as set forth in claim 8 having in addition the step of scarifying the grain prior to steeping the grain.

10. In a process for providing an improved brewing adjunct the steps consisting essentially of:
   (a) selecting a suitable cereal grain from the group consisting of rye and barley;
   (b) steeping said grain in water at a temperature in the range of approximately 50° F. to 190° F. for a period approximately in the range of 1 to 24 hours until its moisture content is increased to more than approximately 22%;
   (c) cooking said steeped grain at a temperature in the range of approximately 200° F. to 220° F. for a period in the range of approximately 5 to 30 minutes for partially gelatinizing the starch, inactivating enzymes and volatilizing flavor bearing lipids;
   (d) drying said cooked grain at an air temperature in the range of approximately 110° F. to 220° F. until the moisture content is in the range of approximately 7% to 11%;
   (e) granulating and debranning or dehusking said grain; and
   (f) using said granulated grain for brewing beer.

11. In a new brewing process the steps consisting essentially of:
(a) providing pregelatinized grain produced by selecting a suitable cereal grain, steeping said grain in water at a temperature in the range of approximately 50° F. to 190° F. for a period approximately in the range of 1 to 24 hours until its moisture content is increased to more than approximately 22%, cooking said steeped grain at a temperature in the range of approximately 200° F. to 220 F. for a period in the range of approximately 5 to 30 minutes, drying said cooked grain at an air temperature in the range of approximately 110° F. to 220° F. until the moisture content is in the range of approximately 7% to 11%, and granulating said grain;
(b) blending said pregelatinized grain with malt and other prepared adjuncts in predetermined proportions to provide the desired characteristics;
(c) mashing said blended pregelatinized grain, other adjuncts and malt until substantially all of the available starches contained therein are converted to fermentable sugars;
(d) drawing the wort from said mash;
(e) boiling said wort;
(f) cooling the wort; and
(g) fermenting the wort.

12. Product produced by the process of claim 6.

References Cited

UNITED STATES PATENTS

| 2,947,667 | 8/1960 | Komm | 195—70 |
| 3,141,833 | 7/1964 | Dixon | 195—70 |
| 3,149,053 | 9/1964 | Kneen et al. | 195—71 |
| 3,342,607 | 9/1967 | Hickey | 99—50X |

OTHER REFERENCES

Hind H. L.: Brewing Science and Practice, vol. I, Chapman & Hall, London, 1950 (pages 283–293), TP 570 H 55 C. 2.

LIONEL M. SHAPIRO, Primary Examiner

D. M. NAFF, Assistant Examiner

U.S. Cl. X.R.

99—50, 53; 195—70